No. 781,149. PATENTED JAN. 31, 1905.
W. W. KING.
FARMING APPLIANCE.
APPLICATION FILED JULY 6, 1904.
2 SHEETS—SHEET 1.
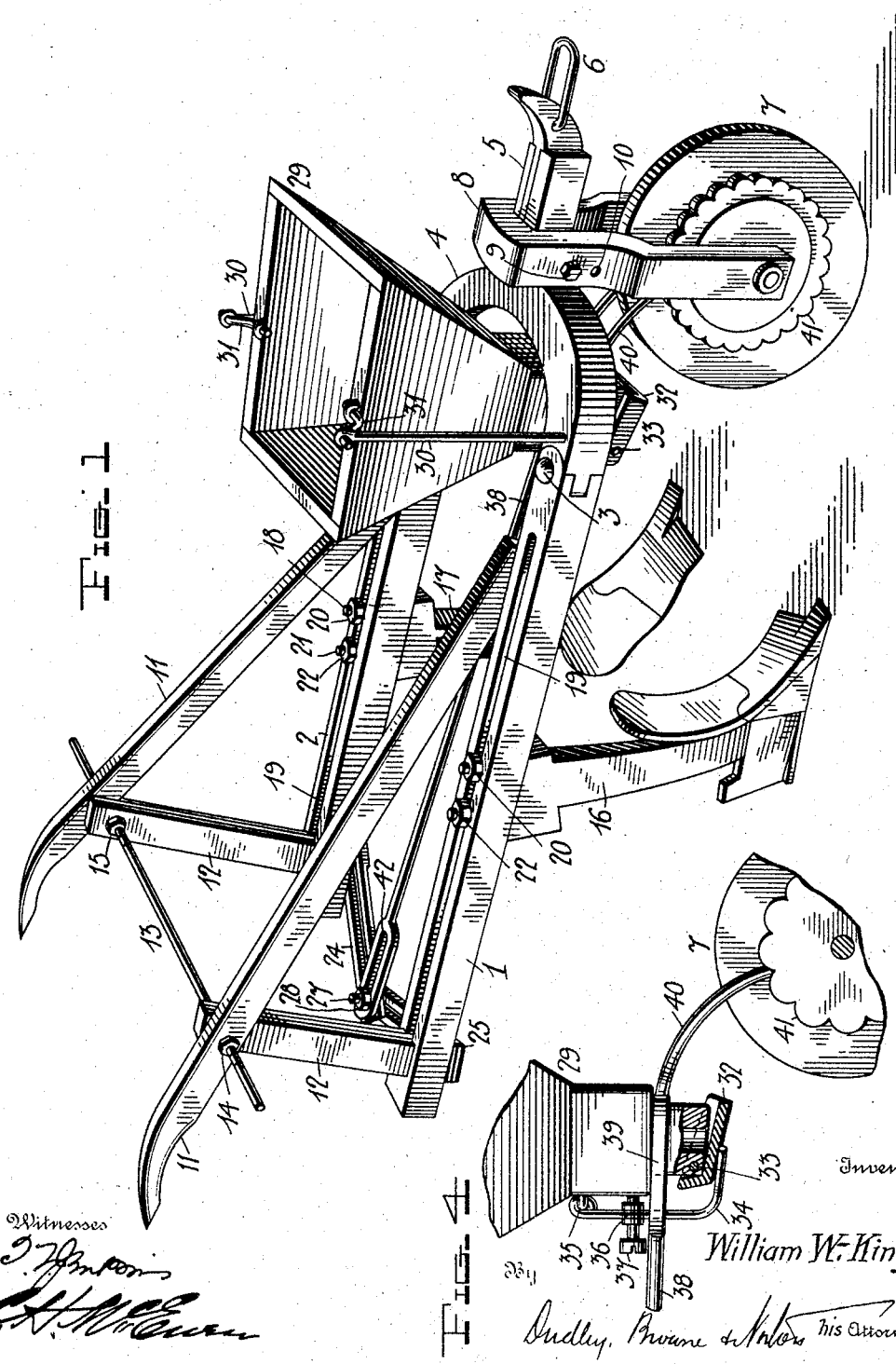

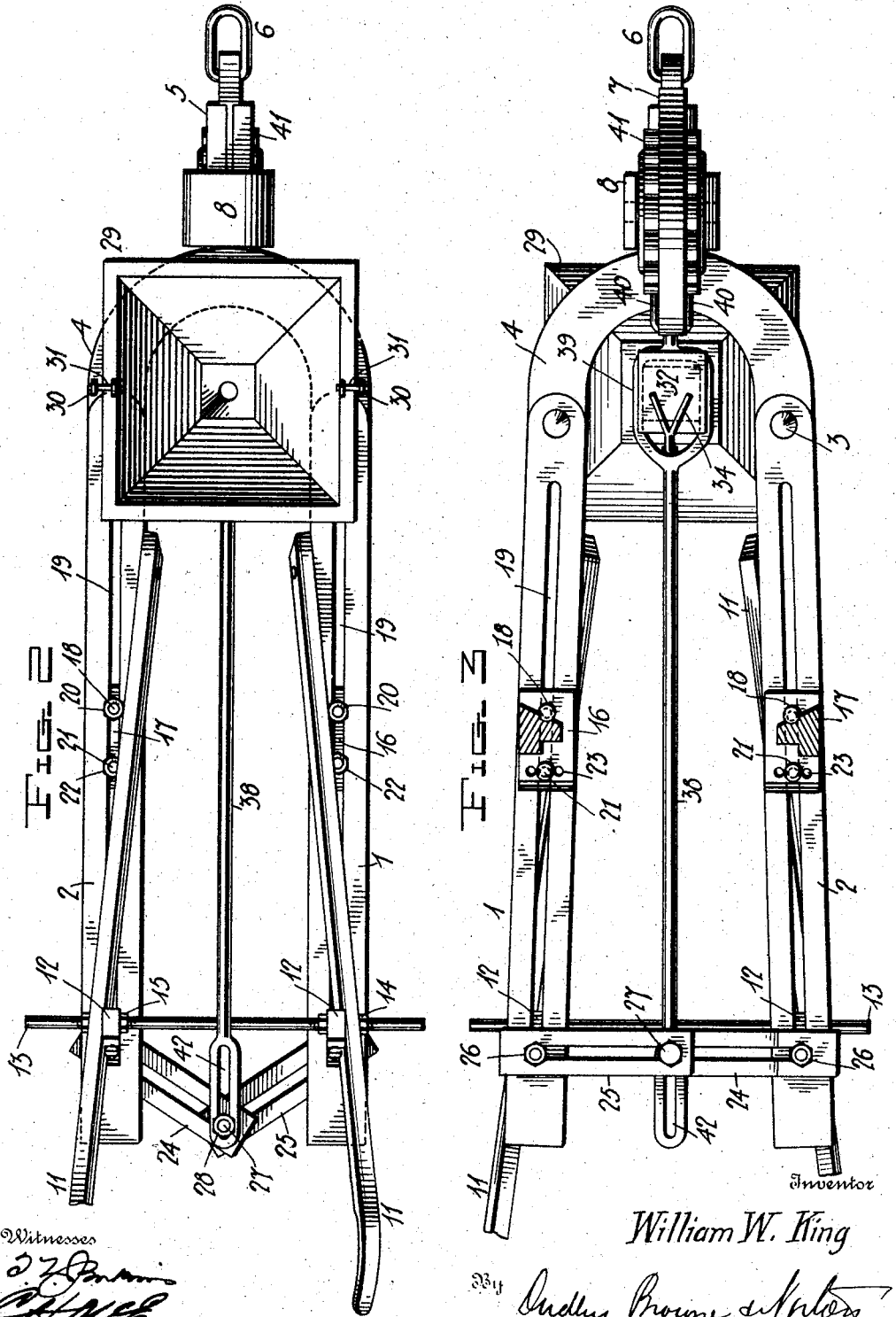

No. 781,149.

Patented January 31, 1905.

UNITED STATES PATENT OFFICE.

WILLIAM WYLIE KING, OF NOLA, MISSISSIPPI, ASSIGNOR OF ONE-HALF TO SOLOMON R. BARDWELL, OF NOLA, MISSISSIPPI.

FARMING APPLIANCE.

SPECIFICATION forming part of Letters Patent No. 781,149, dated January 31, 1905.

Application filed July 6, 1904. Serial No. 215,539.

*To all whom it may concern:*

Be it known that I, WILLIAM WYLIE KING, a citizen of the United States, residing at Nola, in the county of Lawrence and State of Mississippi, have invented certain new and useful Improvements in Farming Appliances; and I do hereby declare the following to be a full, clear, and exact description of the invention, such as will enable others skilled in the art to which it appertains to make and use the same.

This invention, which relates to farming appliances, has for its object the production of a machine capable of being converted at will into a plow or a fertilizer-distributer or into a combined plow and distributer, dependent upon the desired utilization.

The nature of the invention, together with the advantages peculiar to the improved structure, is fully and clearly set forth in the following detailed description, in connection with which reference is to be had to the accompanying drawings, illustrating the invention in its preferred form of embodiment, it being understood that various modifications may be made therein without exceeding the scope of the concluding claims.

In the drawings, Figure 1 is a perspective view of a farming appliance embodying my invention. Fig. 2 is a top plan view. Fig. 3 is a bottom plan view. Fig. 4 is a detail view of the hopper with its adjusting and vibrating means.

Referring to the drawings by numerals, 1 2 designate the plow-beams, which are pivoted at their forward ends by bolts 3 3 to a front frame 4, whereby said beams may be adjusted to or from each other at their rearward ends for a purpose presently to be described. The frame 4, which is of yoke form, has a forward extension 5, to which is secured a draft member 6. The machine is supported at its forward end by a wheel 7, the axle of which is journaled in a fork 8, straddling the frame extension 5 and secured thereto by a bolt 9. A plurality of bolt-holes 10 are provided, whereby the fork may be adjusted relatively to the frame to vary the height of the latter from the ground. The handles 11 are secured at their forward ends to the inner sides of the beams and are supported toward their rearward ends by posts 12, erected from the beams. A cross-rod 13, passed through the posts and handles, serves to connect these parts, and to allow of the stated lateral adjusting movement of the beams the handles and posts are slidable on the rod, but are secured after adjustment by nuts 14 15 on the rod at the sides of a post and handle.

16 17 designate the plow-standards, each being provided at its top with a bolt 18, extending through a slot 19 in the beam, a nut 20 on the bolt serving when tightened to fasten the standard in place. The beams, and consequently the plows carried thereby, are adjustable to or from each other, according to the desired distance between the rows, and to bring the plows in line with the draft regardless of such adjustment each standard is provided rearwardly of the bolt 18 with a like bolt and nut 21 22, extending through the beam-slot and occupying one of a number of holes 23 in the standard. After the adjustment of the beams each standard is turned to bring it in line with the draft, the bolt 18 serving as the pivot, and when properly positioned the bolt 21 is passed through the beam-slot and the hole 23, resigtering therewith, and the nuts are applied to maintain the adjusted position of the plows.

Adjustment of the beams is obtained and maintained by slotted arms 24 25, each pivoted at one end by a bolt 26 to a beam at its under side, said arms being lapped at their opposite ends, as shown more clearly in Fig. 3. A bolt 27, passed through the slots at said lapped ends of the arms, serves with a nut 28 to maintain the adjusted position of the beams. The bolt 27 and nut 28 have the additional function of maintaining the adjustment of the agitating means for the fertilizer-distributing hopper, which will now be described. Said hopper, which is numbered 29, is located at the frame 4 and is yieldingly supported by posts 30 and connecting-links 31.

At the reduced discharge-opening of the hopper is a spout 32, pivoted near its rear end by a pin 33 to the hopper, whereby its free forward end is adjustable to regulate the discharge of material, said adjustment being obtained by an arm 34, pivoted to the hopper at 35 and having its lower end bent forwardly and engaging the under side of the spout. The arm 34 is intermediately provided with a slot 36, through which passes an adjusting-screw 37, turnable in a threaded opening in the hopper-wall, the arm being confined between collars on the screw. Adjustment of the spout is therefore obtained by turning the screw and by movement of the arm, as plainly shown in Fig. 4. By this means the discharge of material is readily controlled independently of the extent of vibration of the hopper. The hopper is vibrated by a rod 38, having an opening or slot 39, through which the lower end of the hopper extends. The rod at its forward end is forked, the fork members 40 extending at the sides of the wheel in the paths of teeth 41, carried by the wheel, which means obtains the vibration of the hopper to insure the proper discharge of the material. The extent of vibrations of the hopper is regulated by longitudinal adjustment of the rod to bring the forked end more or less into the path of the teeth. To maintain such adjustment, the rod is provided at its rear end with a slot 42, through which the bolt 27 passes, and when the nut 28 is tightened the rod is firmly held against longitudinal movement.

The feed of material may be checked by elevating the spout, by adjustment of the rod to clear the teeth, or by removing the hopper. The plows by reason of the beam-slots may be positioned at any desired point along the beams, as shown, or to bring one plow in advance of the other. Also the plows, which as shown are of the right and left type, may be interchanged or may be taken off and other types substituted. The appliance may therefore be converted from a combined plow and fertilizer-distributer into a plow which by reason of the interchangeability and substitution of its plow members and the provision for shifting the positions of the latter may be employed for a variety of purposes. The lateral adjustment of the plows, moreover, enables the making of any width between the rows by the simple act of moving the beams and alining the plow members.

I claim as my invention—

1. In a farming appliance of the character described, a frame, a wheel supporting said frame and carrying a circular series of teeth, laterally-adjustable plow-beams pivoted at their forward ends to said frame, plows on said beams, links pivoted to the rearward ends of the beams and having their ends lapped, a hopper, means for vibrating said hopper including an adjustable rod one end of which is in the path of said teeth and the other end of which is slotted, and a securing-bolt passed through the slot in the rod and through the lapped ends of the links.

2. In a farming appliance of the character described, a wheeled frame, laterally-adjustable plow-beams pivoted at their forward ends to said frame, plows adjustable along said beams, links pivoted to the rearward ends of the beams and having their ends lapped, a hopper, a regulable closure for the hopper discharge-outlet, means for vibrating the hopper including an adjustable rod having in one end a slot, and a securing-bolt passed through the slot in the rod and through the lapped ends of the links.

In testimony whereof I affix my signature in presence of two witnesses.

WILLIAM WYLIE × KING.
his mark

Witnesses:
E. L. SUTTON,
NALA WHITE.